United States Patent [19]

Charles et al.

[11] 4,246,377

[45] Jan. 20, 1981

[54] PROCESS FOR INCREASING MOLECULAR WEIGHT OF POLYBUTYLENE TEREPHTHALATE

[75] Inventors: John J. Charles, Bloomingdale; Robert C. Gasman, West Milford, both of N.J.

[73] Assignee: GAF Corporation, New York, N.Y.

[21] Appl. No.: 86,337

[22] Filed: Oct. 19, 1979

Related U.S. Application Data

[63] Continuation-in-part of Ser. No. 946,745, Sep. 29, 1978, abandoned.

[51] Int. Cl.³ .............................................. C08G 63/76

[52] U.S. Cl. ................................ 525/437; 264/176 R; 528/272

[58] Field of Search ......................... 525/437; 528/272

[56] References Cited

U.S. PATENT DOCUMENTS 3,814,657  6/1974  Haynes ............................ 528/308 X Primary Examiner—Lucille M. Phynes
Attorney, Agent, or Firm—James Magee, Jr.; Joshua J. Ward

[57] ABSTRACT

Molecular weight of PBT is increased by melt processing with bis azido formyl ethylenedioxy phthalate, bis azido formyl propylenedioxy phthalate and mixtures thereof.

6 Claims, No Drawings

PROCESS FOR INCREASING MOLECULAR WEIGHT OF POLYBUTYLENE TEREPHTHALATE

RELATED APPLICATION

This application is a continuation in part of our copending application Ser. No. 946,745 filed Sept. 29, 1978 now abandoned.

BACKGROUND OF THE INVENTION

A primary requirement for polybutylene terephthalate (PBT) resin used for molding, especially for blow molding, is sufficient melt strength to resist deforming under its own weight. Melt strength of a particular PBT resin is generally dependent upon the molecular weight of the resin and the amount of chain-branching present within the resin. Resins with lower molecular weights and no branching have lower melt strength than resins of higher molecular weight or resins with a significant degree of chain-branching in the resin structure.

Melt visocisity imposes an upper limit on the molecular weight of PBT that can be produced in a melt polycondensation reaction. Therefore, higher molecular weight grades of PBT are generally produced by solid state polymerization. This can be done by heating the solid PBT polymer in a finely divided form at a temperature just below its melting point in a vacuum or in an inert gas stream. It has, however, been found uneconomical to advance the molecular weight of PBT by solid state polymerization beyond an intrinsic viscosity of about 1.3 deciliters per gram (dl/g) measured in orthochlorophenol at 25° C. Accordingly, other techniques for advancing PBT molecular weight have been described. German Pat. No. 2,400,097 for instance involves coupling PBT molecules through their hydroxyl or carboxylene groups with smaller molecules such as diepoxides or acid anhydrides. The effectiveness of the latter method depends on the concentration and accessability of reactive end groups.

While PBT of relatively high intrinsic viscosity and PBT with some chain-branching in its structure has been produced, there is a need for a process by which previously formed completely linear PBT can be modified to increase its molecular weight and form a significant amount of chain-branching within the structure of the resin.

SUMMARY OF THE INVENTION

The present invention provides a process for increasing molecular weight of PBT which comprises melt processing PBT having an intrinsic viscosity (IV) between about 0.1 and about 1.4 with between about 0.1 and about 2.0 grams per 100 grams PBT of a chain-branching agent selected from the group consisting of bis azido formyl ethylenedioxy phthalate and bis azido formyl propylenedioxy phthalate.

DETAILED DESCRIPTION OF THE INVENTION

As mentioned above, the invention provides for increasing the molecular weight of PBT by melt processing the PBT with bis azido formyl ethylenedioxy phthalate or bis azido formyl propylenedioxy phthalate. PBT used as the starting material for the process of the invention may be produced in any suitable manner such as by reacting terephthalic acid or a dialkyl ester of terephthalic acid, e.g. dimethyl terephthalate, with diols having four carbon atoms, e.g. tetramethylene glycol. PBT for use in practicing the invention has an initial intrinsic viscosity (IV) between about 0.1 and about 1.5 deciliters per gram (dl/g) measured in orthochlorophenol at 25° C. with material having an IV between about 0.5 and about 1.1 dl/g being preferred. Manufactured of PBT is well known to those skilled in the art as are the techniques for obtaining PBT of desired intrinsic viscosity. Such conventional production techniques are discussed in greater detail for instance in U.S. Pat. No. 2,465,319. PBT produced by such conventional techniques is usually essentially linear in form with little, if any, chain-branching present in the PBT structure. It should be understood, however, that the invention may be practiced using PBT manufactured by other techniques or which has been modified as to have some chain-branching present.

The chain-branching agent with which PBT is melt processed in accordance with the invention may be either bis azido formyl ethylenedioxy phthalate or bis azido formyl propylenedioxy phthalate. Either ortho, meta or para substituted phthalates as well as mixtures thereof are suitable. Such compounds have the general formula:

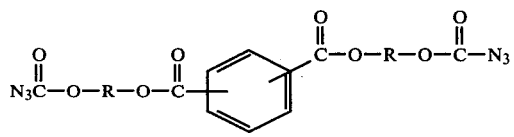

Such compounds may be produced by various methods. For example, they can be prepared from the corresponding hydroxyl terminated low molecular weight condensation products of a glycol and phthalic acid with the hydroxyl terminated compounds prepared by a transesterification reaction using a dimethyl ester of a phthalic acid and a glycol. Preparation of such compounds is described in greater detail for instance in U.S. Pat. No. 3,814,657 the disclosure of which is incorporated herein by reference. The chain-branching agents specified herein are used in the invention in amounts between about 0.05 and about 2 grams per 100 grams of PBT with amounts between about 0.1 and about 1.0 grams per 100 grams PBT being preferred.

While the mechanism by which melt processing PBT in accordance with the invention increases the molecular weight and chain-branching of the PBT is not fully understood, it is believed that the difunctional azido formates used decompose on heating to give highly reactive nitrene species. These nitrenes are believed to react rapidly with any and all carbons on the PBT molecules by an insertion mechanism, thus producing chain-branching throughout the structure of the PBT resin and increasing the molecular weight and intrinsic viscosity of the PBT. This route to molecular weight increase is capable of providing higher molecular weight products than either solid state polymerization or coupling polyester molecule end groups.

The melt processing reaction of PBT with chain-branching agent in accordance with the invention may be carried out in any suitable apparatus. Extruders, injection molding machines, two roll mills, etc. are for instance suitable for this purpose. Prior to the actual melt processing step, the chain-branching agent and PBT should be uniformly blended to allow for a complete exposure of all of the PBT to the chain-branching agent during the melt processing. While various conventional techniques such as dry blending of powders of PBT and chain-branching agent may be used, it is preferred that a solution or emulsion of chain-branching agent to be coated onto individual particles of PBT prior to the melt processing. A preferred method of dispersing the chain-branching agent in the PBT prior to melt processing is to slurry fine particles of PBT with a solution of the chain-branching agent and then to evaporate the solvent prior to placing the coated PBT particles in the melt processing equipment. For this purpose it is preferred that the PBT be in the form of particles having average diameters between about 0.5 and about 500 microns. In this preferred embodiment of the invention the chain-branching agent may be supplied in the form of a solution having a concentration between about 1 and about 90 weight percent chain-branching agent with a suitable solvent for the chain-branching agent being used. Suitable solvents include for instance such conventional solvents as methyl ethyl ketone, methyl isobutyl ketone, trichloroethylene, toluene, chloroform, methylene chloride, tetrahydrofuran, etc. Solutions or emulsions containing between about 10 and about 60 wt% chain-branching agent are preferred.

In the preferred embodiment of the invention where fine particles of PBT are coated with a solution or emulsion of chain-branching agent, the water or solvent is preferably removed by drying or heating prior to introducing the coated particles of PBT into the melt processing apparatus. This may be done by air drying, vacuum drying, heating, etc.

Temperatures and reaction times appropriate to conventional melt processing of PBT are employed in connection with the invention, for instance, the temperatures generally range between 230° and 270° C. with temperatures between about 240° and about 260° C. in the actual melt processing stage being employed. Reaction times in the melt processing stage usually vary between about 20 and about 300 seconds with times of between about 30 and about 200 seconds being preferred. Melt viscosity of the PBT during the melt processing is usually between about 1,000 and about 60,000 poises with melt viscosities between about 2,000 and about 30,000 poises being preferred.

The following examples illustrate various embodiments of the invention but are not intended to limit the scope of the invention.

EXAMPLE I

To a slurry of 1,000 grams of powdered polybutylene terephthalate resin (average diameter 50 microns) having an intrinsic viscosity of 0.8 in 5,000 milliters of acetone was added 40 grams of a 25% solution in methyl isobutyl ketone of bis azido formyl ethylenedioxy isophthalate. The entire mixture was placed in a 5 gallon plastic carbuoy and rotated for 3 hours on a roll coater to thoroughly mix the slurry. The slurry was then poured into flat baking pans and air dried. The air dried resin was then dried under a vacuum of 0.5-5.0 mm Hg at 40° C. for 2-3 hours. The vacuum dried resin was then melt processed in a Midland Ross 1.5 inch extruder at barrel temperatures of 200° C., 220° C., 220° C., 240° C., 250° C., a pressure of 0-200 psi and a screw rpm of 75. This provided 120-180 seconds of residence time in the melt processing stage at a temperature of 240°-250° C. The intrinsic viscosity of the extruded resin was found to be 0.86.

EXAMPLE II

Powdered PBT having an intrinsic viscosity of 0.8 dl/g was treated as described above except that 80 grams of the 25% solution of bix azido formyl ethylenedioxy phthalate was used. Molecular weight of the treated extruded PBT was sufficiently increased by this treatment that the polymer was no longer soluble in orthochlorophenol. This indicated that the intrinsic viscosity was substantially in excess of 2.0.

EXAMPLE III

The process of Example 1 may be followed except that 60 grams of a 25% solution in toluene of bis azido formyl propylenedioxy isophthalate may be used.

EXAMPLE IV

The process of Example 1 may be followed except that 100 grams of a 25 wt% solution in methyl ethyl ketone of bis azido formyl ethylenedioxy terephthalate may be used.

Chain-branching agents suitable for reacting with PBT by melt processing in accordance with the invention include the following:
bis azido formyl ethylenedioxy terephthalate
bis azido formyl ethylenedioxy isophthalate
bis azido formyl ethylenedioxy orthophthalate
bis azido formyl propylenedioxy isophthalate
bis azido formyl propylenedioxy terephthalate
bis azido formyl propylenedioxy orthophthalate While the invention has been described above with respect to certain embodiments thereof, it will be understood by those skilled in the art that various changes and modifications may be made without departing from the spirit or scope of the invention.

What we claim is:

1. Process for increasing the molecular weight of polybutylene terephthalate which comprises melt processing polybutylene terephthalate having an intrinsic viscosity and between about 0.1 and about 1.4 dl/g with a chain-branching agent selected from the group consisting of bis azido formyl ethylenedioxy phthalate, bis azido formyl propylenedioxy phthalate and mixtures thereof.

2. Process according to claim 1 wherein the melt processing reaction is carried out at a temperature between about 230° and about 270° C. for a time between about 20 and between about 300 seconds.

3. Processing according to claim 2 wherein the chain-branching agent is uniformly dispersed throughout the polybutylene terephthalate prior to the melt processing reaction and is used in amounts of between about 0.05 and about 2 grams per 100 grams of polybutylene terephthalate.

4. Process according to claim 3 wherein dispersion of chain-branching agent in polybutylene terephthalate is carried out by thoroughly mixing particles of polybutylene terephthalate of an average particle size between about 0.5 micron and about 500 microns with a solution or emulsion of chain-branching agent to thereby coat such particles and then removing solvent prior to the melt processing of the chain-branching agent and the polybutylene terephthalate.

5. Process according to claim 4 wherein the chain-branching agent is bis azido formyl ethylenedioxy phthalate.

6. Process according to claim 3 wherein the melt processing is carried out by extrusion of a uniform blend of polybutylene terephthalate in the form of particles having an average particle size between about 0.5 micron and about 500 microns, such particles being coated with the chain-branching agent.

* * * * *